Patented May 28, 1946

2,401,219

UNITED STATES PATENT OFFICE 2,401,219

β-DIMETHYLAMINOETHYL ESTER OF BENZILIC ACID AND ITS ACID ADDITION SALTS

Frederick F. Blicke, Ann Arbor, Mich., assignor to The Regents of the University of Michigan, Ann Arbor, Mich., a constitutional corporation of Michigan No Drawing. Application July 19, 1944, Serial No. 545,726

3 Claims. (Cl. 260—473)

My invention relates to the β-dimethylaminoethyl ester of benzilic acid, and its acid addition salts; and to the method of preparing such ester and such salts.

The β-dimethylaminoethyl ester of benzilic acid, which also may be called the β-dimethylaminoethyl ester of diphenylhydroxy-acetic acid, is found to possess a very advantageous combination of highly desirable properties. It is not only a mydriatic, and not only a local anesthetic, but is also an antispasmodic of very high effectiveness; and it has relatively low toxicity in comparison to its effectiveness in all these fields of usefulness—in other words, a high therapeutic ratio.

The formula of the hydrochloride of this ester is as follows:

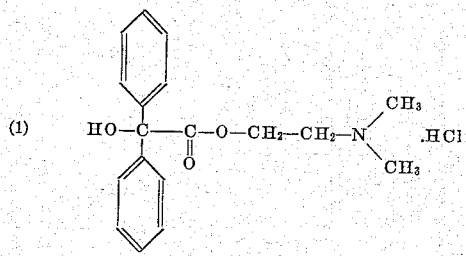

This ester hydrochloride may be prepared as follows:

A solution of 11.40 g. (0.05 mole) of benzilic acid (conveniently obtained by the oxidation of benzoin in the manner set forth in Organic Syntheses, Coll. Vol. 1, page 336, Second Edition,) and 5.38 g. (0.05 mole) of β-dimethylaminoethyl chloride in about 75 cc. of dry isopropyl alcohol (which desirably had been dried by being heated with calcium oxide and then distilled from the calcium oxide) is refluxed on a steam bath for several hours, conveniently about 8 to 12 hours. Then the solvent is suitably removed, as by evaporation under reduced pressure or by being exposed to a stream of air; which leaves a residue which though it may sometimes be oily is usually solid. This residue is thoroughly washed, desirably several times, with absolute ether, with thorough mixing in the washing and with trituration if the residue is solid; after which the residue is recrystallized one or more times from a mixture of ethyl acetate and alcohol or of ether and alcohol. The product so obtained is in the form of white, water-soluble crystals, and is the desired β-dimethylaminoethyl benzilate hydrochloride, of Formula 1 above. It has a melting point of 183–185° C.

The free base may be suitably obtained from this ester hydrochloride, as by treating the ester hydrochloride with a molecular proportion (or more) of potassium or sodium hydroxide or potassium or sodium carbonate, conveniently in aqueous solution. The free base, however, is a water-insoluble oil, and for therapeutic purposes the acid addition salts are preferable, such for instance as the hydrochloride.

Any desired acid addition salt of the free base may be prepared by treating the free base with the appropriate acid, such for instance as hydrochloric acid, sulfuric acid, acetic acid, or phosphoric acid, to produce respectively the hydrochloride, the sulfate, the acetate, or the phosphate. It is usually most convenient, however, to use the hydrochloride, which is obtained as the initial product without going through the free-base step.

For therapeutic purposes the acid addition salts, and particularly the hydrochloride, are usually preferable to the free base, because of their water solubility and the greater ease of handling them; and they may be so used either orally or parenterally.

More extensive tests have been made on the effectiveness of β-dimethylaminoethyl benzilate hydrochloride than on either the free base or the other acid addition salts. These show the following general results:

I. As an antispasmodic: This effect was tested in several ways:

a. When tested on the isolated unstimulated intestine from the rabbit, β-dimethylaminoethyl benzilate hydrochloride was found to be 4 to 20 times as active as "Syntropan" (the phosphate of the 2,2-dimethyl-3-diethylaminopropyl ester of tropic acid); 8 to 40 times as active as "Trasentin" (the hydrochloride of the 2-diethylaminoethyl ester of diphenylacetic acid); and 4 to 20 times as active as "Pavatrine" (the diethylaminoethyl ester of fluorene-9-carboxylic acid).

b. When tested for neurotropic effect by tests on isolated rabbit intestine which had been stimulated with acetyl β-methylcholine, it is found to be about 21 times as active as either "Syntropan" or "Trasentin," and about 2.5 times as active as "Pavatrine."

c. When tested for musculotropic effects by tests on isolated guinea pig intestine which had been stimulated with histamine, it is found to be approximately 40 to 100 times as active as "Syntropan," and 4 to 10 times as active as "Trasentin."

d. When tested by oral administration on the anesthetized cat, it was found to be 4 to 6 times as active as "Syntropan," about 20 times as active as "Trasentin," and about 13 times as active as "Pavatrine."

II. As a mydriatic:

a. When applied locally to the eye of the albino rabbit, it causes a pupillary dilatation similar to that effected by atropine, and it abolishes the light reflex. The minimal effective concentration is 0.05 to 0.10 percent; which indicates that it is about 7.5 times as active as "Syntropan."

III. As a local anesthetic:

a. A one-percent solution of it applied locally in the eye of the rabbit produces a local anesthesia that lasts for about 15–22 minutes, and produces no irritation. In this test it is approximately as effective as a local anesthetic as is "Metycaine" (Gamma-[2 - methyl - piperidino]-propyl Benzoate Hydrochloride, Lilly).

IV. Toxicity:

a. When tested intravenously in mice for acute toxicity, it has a somewhat greater absolute toxicity than has "Syntropan," but a somewhat less absolute toxicity than has "Trasentin"; but in terms of therapeutic ratio (the ratio of minimal lethal dose to effective dose) as an antispasmodic, it has less toxicity than either "Syntropan" or "Trasentin"—that is, it has a higher therapeutic index than has either "Syntropan" or "Trasentin."

b. When tested intravenously in rats, the comparative results are in general the same as in mice.

c. When tested for chronic toxicity, 6 groups of 5 rats each were fed diets in which various concentrations of $\beta$-dimethylaminoethyl benzilate hydrochloride were incorporated. All rats in all groups survived a 28-day-test period; and none of them showed pathological lesions on subsequent necropsy. The concentrations given ranged from 0.05 percent to 1.0 percent of the total diet.

I claim as my invention:

1. $\beta$-Dimethylaminoethyl benzilate.
2. An acid addition salt of $\beta$-dimethylaminoethyl benzilate.
3. $\beta$-Dimethylaminoethylbenzilate hydrochloride.

FREDERICK F. BLICKE.